US010255607B2

(12) United States Patent
Swirsky et al.

(10) Patent No.: US 10,255,607 B2
(45) Date of Patent: Apr. 9, 2019

(54) COLLECTING CONSUMER INFORMATION

(75) Inventors: Robert A. Swirsky, Sunnyvale, CA (US); Scott Watson, Marina del Rey, CA (US)

(73) Assignee: Disney Enterprises, Inc., Burbank, CA (US)

( * ) Notice: Subject to any disclaimer, the term of this patent is extended or adjusted under 35 U.S.C. 154(b) by 2598 days.

(21) Appl. No.: 11/599,913

(22) Filed: Nov. 15, 2006

(65) Prior Publication Data

US 2008/0114649 A1 May 15, 2008

(51) Int. Cl.
*G06Q 30/02* (2012.01)

(52) U.S. Cl.
CPC ......... *G06Q 30/02* (2013.01); *G06Q 30/0267* (2013.01); *G06Q 30/0277* (2013.01)

(58) Field of Classification Search
CPC ...................................... G06Q 30/02–30/0277
USPC ..................................................... 705/26, 14
See application file for complete search history.

(56) References Cited

U.S. PATENT DOCUMENTS 5,794,145 A 8/1998 Milam
6,084,528 A 7/2000 Beach et al.
6,125,281 A 9/2000 Wells et al.
6,138,914 A 10/2000 Campo et al.
6,243,447 B1 6/2001 Swartz et al.
6,330,244 B1 12/2001 Swartz et al.
6,330,975 B1 12/2001 Bunte et al.
6,351,648 B1 2/2002 Karapetkov et al.
6,405,035 B1 6/2002 Singh
6,415,156 B1 7/2002 Stadelmann
6,426,830 B1 7/2002 Robinson
6,650,877 B1 * 11/2003 Tarbouriech et al. ..... 455/186.1
6,839,564 B2 1/2005 Sutinen et al.
7,873,708 B2 * 1/2011 Durand et al. ................ 709/219
8,135,166 B2 * 3/2012 Rhoads .................. G01C 11/00 358/3.28
8,489,452 B1 * 7/2013 Warner ............. G06Q 30/0226 705/14.34
2001/0049274 A1 12/2001 Degraeve
2002/0046085 A1 * 4/2002 Rochon et al. ................. 705/14
2002/0093426 A1 7/2002 Jackson et al.
2002/0137530 A1 9/2002 Karve
(Continued)

FOREIGN PATENT DOCUMENTS

DE 201 01 221 4/2001
DE 100 22 632 2/2002
(Continued)

OTHER PUBLICATIONS

International Search Report for International Application No. PCT/US2007/23905 (2 pages).

*Primary Examiner* — Jamie R Kucab
(74) *Attorney, Agent, or Firm* — Farjami & Farjami LLP

(57) ABSTRACT

Methods, systems, and apparatus, including computer program products, for collecting consumer information. A first message is received from a portable communication device having a device identifier. The first message includes an item code that identifies a promotional item. It is verified whether the device identifier is registered for a promotional service corresponding to the item code. If the device identifier is not registered for the promotional service, a second message is sent to the portable communication device, where the second message requests an address for delivering the promotional item.

22 Claims, 4 Drawing Sheets

100
110 Advertisement
112 Product/ Service Description
114 Promotional Item Description
Item Code
Contact Info
116
118
120 Portable Communication Device
130 Promotional Service Provider
140 1st Message
Item Code
Device ID
132 Data Processing Apparatus
150 2nd Message
152 Address Request
122 Device ID
160 3rd Message
Device ID
Address Info
162
Storage
134 Consumer Information
136

(56) References Cited

U.S. PATENT DOCUMENTS

| | | | | |
|---|---|---|---|---|
| 2003/0083046 | A1 | 5/2003 | Mathis | |
| 2003/0096600 | A1 | 5/2003 | Lewis et al. | |
| 2003/0153302 | A1 | 8/2003 | Lewis et al. | |
| 2003/0236709 | A1* | 12/2003 | Hendra et al. | 705/26 |
| 2004/0152477 | A1 | 8/2004 | Wu et al. | |
| 2004/0176081 | A1 | 9/2004 | Bryham et al. | |
| 2004/0181461 | A1* | 9/2004 | Raiyani et al. | 705/26 |
| 2004/0209632 | A1 | 10/2004 | Link, II et al. | |
| 2005/0076100 | A1 | 4/2005 | Armstrong | |
| 2005/0079873 | A1 | 4/2005 | Caspi et al. | |
| 2005/0119017 | A1 | 6/2005 | Lovell, Jr. et al. | |
| 2005/0176404 | A1 | 8/2005 | Hundscheidt et al. | |
| 2005/0182667 | A1* | 8/2005 | Metzger et al. | 705/4 |
| 2005/0182678 | A1 | 8/2005 | Walker et al. | |
| 2005/0185060 | A1* | 8/2005 | Neven, Sr. | 348/211.2 |
| 2005/0186975 | A1 | 8/2005 | Yach et al. | |
| 2006/0095324 | A1* | 5/2006 | Vergeyle et al. | 705/14 |
| 2007/0162350 | A1* | 7/2007 | Friedman | 705/26 |
| 2008/0059309 | A1* | 3/2008 | Welch | 705/14 |

FOREIGN PATENT DOCUMENTS

| | | |
|---|---|---|
| EP | 0 986 275 | 3/2000 |
| EP | 1 199 660 | 4/2002 |
| FR | 2 817 108 | 5/2002 |
| GB | 2 338 144 | 12/1999 |
| JP | 6-120943 | 4/1994 |
| JP | 2001-092736 A | 4/2001 |
| JP | 2002-279268 A | 9/2002 |
| JP | 2004-234686 A | 8/2004 |
| JP | 2004-334861 A | 11/2004 |
| JP | 2005-306522 A | 11/2005 |
| SE | 9801266 | 10/1999 |
| WO | WO 92/16066 | 9/1992 |
| WO | WO 2006/112608 | 10/2006 |

* cited by examiner

COLLECTING CONSUMER INFORMATION

BACKGROUND

The present invention relates to advertising commercial products and services and, in particular, to collecting consumer information.

Commercial products and services are advertised in many different communication media. Traditionally, advertisements are placed in newspapers, displayed in public places or on billboards, broadcasted through television or radio, or mailed directly to the potential consumers. Recently, more and more advertisements are delivered in electronic media, such as the Internet. For example, advertisements are displayed at different web sites or transmitted in electronic messages, such as e-mails.

Advertisements are often combined with promotions. These promotions can include a reduced price for the advertised product or service; or a promotional item can be offered free of charge or at a reduced price if the consumer buys or orders the advertised product or service. The promotional item may or may not be related to the advertised product or service. The related promotional item can include an item that the consumer will likely use if he or she purchases the advertised product or service; the unrelated promotional item can include a small present that may be desirable to consumers in general.

A known method of advertisement is direct response marketing. Direct response marketing uses advertisements that ask the consumers to respond directly to the advertisers. For example, the direct response advertisement can include an addressed response card that the consumer can send through regular mail to the advertiser to order products or services, such as magazine subscriptions. Other direct response advertisements include a phone number or an internet link that the consumer can use to order the advertised products or services. Direct response advertisements are often delivered to the consumers by regular mail. Thus, the advertiser needs to know the addresses of the qualified prospective consumers. The advertiser may have its own list of such prospective consumers, or it can by the list from a specialized service.

SUMMARY

Consumer information, including a delivery address, is collected by an automated service when a promotional item is ordered from a portable communication device. The collected consumer information can be used for targeted distribution of future advertisements.

In general, in one aspect, the present invention provides methods, systems, and apparatus, including software products, for collecting consumer information. A first message is received from a portable communication device having a device identifier. The first message includes an item code that identifies a promotional item. It is verified whether the device identifier is registered for a promotional service corresponding to the item code. If the device identifier is not registered for the promotional service, a second message is sent to the portable communication device, where the second message requests an address for delivering the promotional item.

Particular implementations can include one or more of the following features. A third message can be received from the portable communication device in response to the second message. The third message can include address information. It can be verified whether the address information corresponds to a postal address. The address information can be sent to a delivery service for delivering the promotional item. The address information can be stored in association with the device identifier. The first, second or third message can include a text message. If the device identifier is registered for the promotional service, address information associated with the registered device identifier can be retrieved. The retrieved address information can be sent to a delivery service for delivering the promotional item. The portable device can be a handheld device. The handheld device can include a telephone component. The device identifier can include a telephone number associated with the telephone component. The first message can include image or audio information, and the item code can be identified from the image or audio information. The promotional item can include a physical object, and can be free of charge to consumers. A confirmation or information about canceling registration with the promotional service can be sent to the portable communication device.

In general, in another aspect, the present invention provides a portable communication device having a device identifier. The device includes an information capturing module to capture information including an item code that identifies a promotional item; an information processing module configured to identify from the captured information the item code, and to identify a promotional service provider based on the item code; and a communication module configured to transmit the device identifier and the item code to the promotional service provider and to receive a message from the promotional service provider in response to the transmitted item code.

Particular implementations can include one or more of the following features. The information capturing module can include a keyboard to receive user input, and the information processing module can be configured to identify the item code from the user input received by the keyboard. The information capturing module can include an image capturing component to capture image information, and the information processing module can be configured to identify the item code in the captured image information. The information capturing module can include an audio capturing component to capture audio information, and the information processing module can be configured to identify the item code in the captured audio information. The information capturing module can include a bar code reader or an RFID reader. The communication module can be configured to transmit the identified item code in a text message. The communication module can include a telephone component, and the device identifier can include a phone number associated with the telephone component.

In general, in yet another aspect, the present invention provides methods, systems, and apparatus, including software products, for collecting consumer information. An item code is received from a portable communication device of a consumer, wherein the item code identifies a promotional item offered by a promotional service. Contact information of the consumer is received from the portable communication device. It is verified whether the consumer is registered for the promotional service. If the consumer is not registered for the promotional service, the contact information of the consumer is stored. The contact information of the consumer is processed for delivering the promotional item.

Particular implementations can include one or more of the following features. A device identifier of the portable communication device can be received. The device identifier and the item code can be received in a first message from the portable communication device. Verifying whether the consumer is registered can include verifying whether the device identifier is registered. The contact information of the consumer can be received in the first message. A second message can be sent to the portable communication device, where the second message requests the contact information of the consumer. The contact information of the consumer can be received in a third message from the portable communication device in response to the second message. The contact information of the consumer can include a consumer address for delivering the promotional item. Information can be sent to the portable communication device about opting out of the promotional service.

Particular implementations can realize one or more of the following advantages. A promotional item identifier can be added to any traditional advertisement to turn that advertisement into a direct response advertisement. Consumers can conveniently order the promotional items by using a Short Message Service ("SMS") or other text messaging service through their portable communication device. The consumers can order the promotional items without any prior registration. The portable communication device can include an image or audio capture element to capture the promotional item identifier without requiring the consumer to use a keyboard. The promotional item identifier can also include a one or two dimensional bar code or a radio frequency identification (RFID), and the portable communication device can include a bar code or RFID reader to easily and reliably detect the promotional item identifier. The portable communication device can contact a promotional service provider without requiring the consumer to enter the phone number or other contact information of that service. For example, the portable communication device can recognize the promotional service provider based on the promotional item identifier, and automatically contact that service provider using prestored contact information. Or the portable communication device can include a special ("SendMeStuff") button or function that the consumer can easily activate to contact the corresponding promotional service provider. If promotional items are offered free of charge, consumers may be willing to provide their postal address or other contact information to the promotional service. The promotional service provider can deliver the promotional item to the consumer with further advertisements related to the promotional item or the service or product which was advertised with the promotional item. The promotional service provider can collect and process the consumer information automatically or with minimal human intervention. In one implementation, the promotional service can be run by one or more advertisers to collect valuable consumer information. Or the promotional service can be run by an independent service provider from which the advertisers can buy the consumer information. The independent service provider can directly forward the collected consumer information to the advertisers, or it can process the consumer information before offering it for sale to the advertisers. In alternative implementations, the promotional service can be run by a direct seller of goods or services. The direct seller can use the collected consumer information, or provide or sell it to advertisers. If the promotional items are related to the advertised product or service, the collected consumer information can be used to assemble consumer lists for efficient direct response marketing.

BRIEF DESCRIPTION OF THE DRAWINGS

Like reference numerals are used for like and corresponding parts of the various drawings.

DETAILED DESCRIPTION

Figure 1:
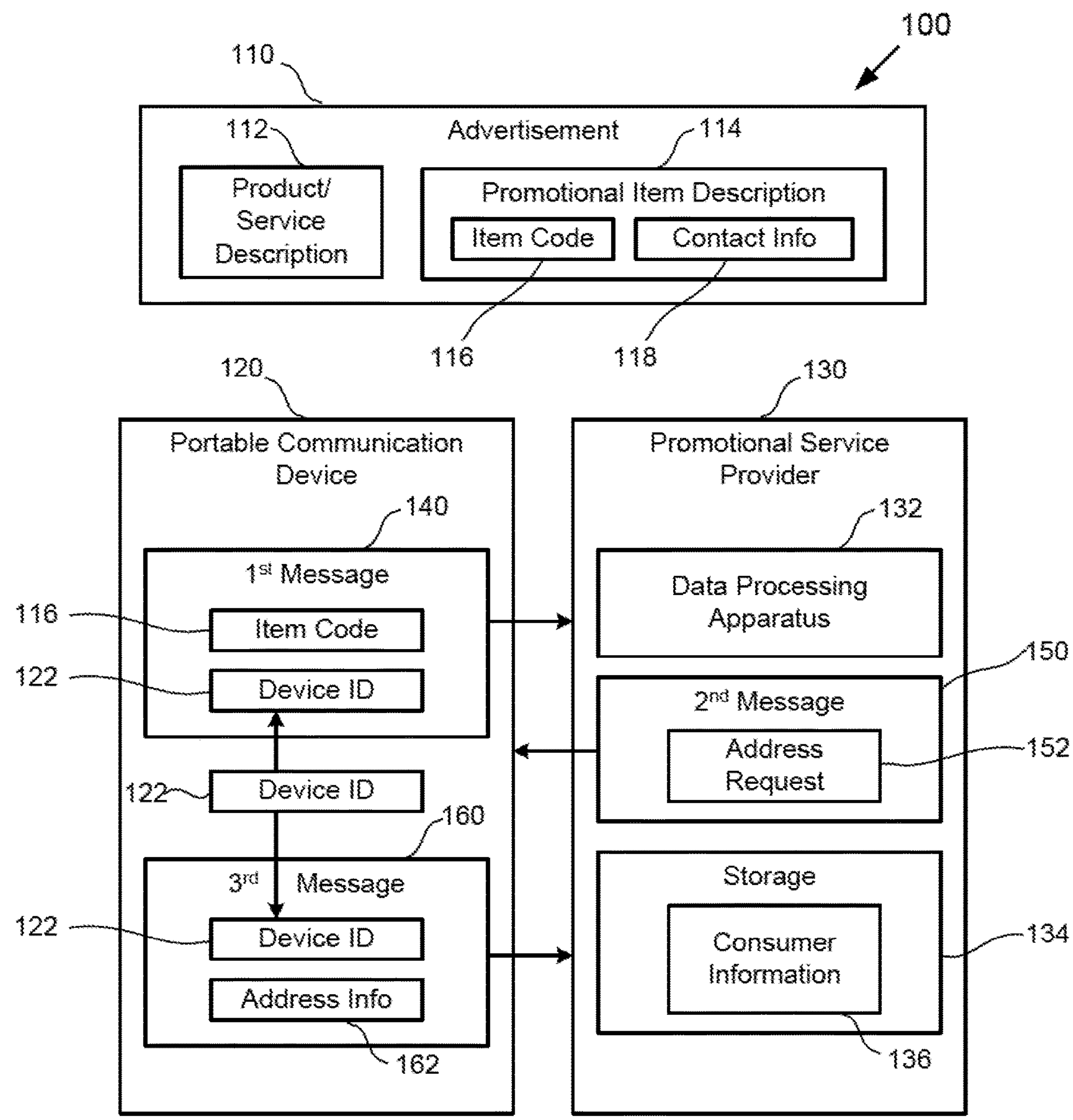
FIG. 1 is a schematic diagram illustrating a system for collecting consumer information.

FIG. 1 illustrates a system 100 for collecting consumer information. The system 100 includes an advertisement 110, a portable communication device 120, and a promotional service provider 130. The advertisement 110 is delivered to consumers through any communication media, such as a newspaper, a public display, a billboard, radio or television broadcast, traditional or electronic mail, or the Internet. The portable communication device 120 includes a mobile phone, a PDA, or any other communication device that the consumer can use to contact the promotional service provider 130 from which the promotional items can be ordered. By using the system 100, the consumer can conveniently order the promotional items, for example, without prior registration at the promotional service provider 130. In exchange, the promotional service provider 130 can collect valuable information about the consumer.

The advertisement 110 includes a product/service description 112 and a promotional item description 114. The product/service description 112 specifies the product or service that is advertised. The product/service description 112 can include text, one or more images, or (in some media) an animation, audio, video or any other content to describe the advertised product or service. In alternative implementations, the product/service description 112 can be omitted from the advertisement 110.

The promotional item description 114 specifies at least one promotional item and can further identify the promotional service provider 130 from which the promotional item can be ordered. In one implementation, the promotional item description 114 includes both a promotional item code 116 and contact information 118 that can be used to order the promotional item. In alternative implementations, the promotional item description 114 can include either the promotional item code 116 or the contact information 118.

The promotional item code 116 identifies the promotional item for the promotional service provider 130. The promotional item code 116 can be defined by a series of characters, such as numbers and letters. The promotional item code 116 can also be defined by an image, a one or two dimensional bar code, or an RFID. If no separate contact information 118 is provided in the advertisement 110, the promotional item code 116 can be configured to identify the promotional service provider as well. In one implementation, the promotional item code 116 is issued by the promotional service provider 130. Alternatively, the promotional item code 116 can be issued by the advertiser and registered at the promotional service provider 130.

The contact information 118 can be used to contact the promotional service provider 130. In one implementation, the contact information 118 includes a phone number, a contact code, or a "text-to" number for sending text messages, for example in SMS format, to the promotional service provider 130. The contact information 118 can also include a phone number to access an operator of the promotional service provider 130. Or the contact information 118 can include an e-mail address or a URL of a web site through which the promotional service provider 130 can be contacted. The contact information 118 can be defined by a series of characters, such as numbers and letters. The contact information 118 can also be defined by an image, a one or two dimensional bar code, or an RFID. For example, the contact information 118 can be defined by a logo (e.g., "SendMeStuff") from which the promotional service provider 130 can be identified. Based on the logo, the consumer or the portable communication device 120 can identify a way to contact the service provider 130. If no separate promotional item code 116 is provided in the advertisement 110, the contact information 118 can be configured to identify the promotional item as well.

The portable communication device 120 can include a mobile phone, a PDA, or any other portable device that has a communication module to provide wireless access to the promotional service provider 130. In alternative implementations, the portable communication device 120 can be connected (plugged in) to a wired communication system through which the promotional service provider 130 can be accessed. The portable communication device 120 has a device ID 122 that uniquely identifies the portable communication device 120. In one implementation, the device ID 122 can also be used by other communication devices to contact the portable communication device 120. For example, if the communication device 120 includes a mobile phone, the device ID 122 can include the phone number of that mobile phone. The device ID 122 can also include an ID number, such as a model or serial number, that has been assigned to the communication device 120 at the time of manufacturing.

To request the promotional item, the communication device 120 sends a first message 140 to the promotional service provider 130. The first message 140 includes the promotional item code 116 to identify the requested promotional item and the device ID 122 to identify the requester. In one implementation, the first message 140 includes an SMS or other text message that the consumer can type by using a keyboard of the communication device 120. Alternatively, the first message 140 can include audio, video, image or any other information captured by the communication device 120. For example, the first message 140 can include an image of the promotional item code 116 as presented in the advertisement 110, or audio information in which the consumer's voice identifies the promotional item or the promotional item code 116. The portable communication device 120 can send the audio information "live" to the promotional service 130 through an automated telephone service. Alternatively, the portable communication device 120 can record the entire audio information before sending it to the promotional service 130 through a digital data channel.

In an alternative implementation, the first message 140 includes further contact information (not shown) in addition to the device ID 122. For example, the further contact information can include an alternative phone number, an e-mail address or a traditional mail address. The further contact information can be prestored in the portable communication device 120, and can be automatically added to the first 140. Or, the portable communication device 120 can display a menu from which the consumer can select further contact information to be added to the first message 140.

The promotional service provider 130 manages the promotional service which can be provided by an advertiser, a third party, or a direct supplier of the promotional item or the advertised product or service. The promotional service provider 130 has a data processing apparatus 132 to process incoming messages, such as the first message 140. The data processing apparatus 132 is configured to analyze the first message 140 to identify that the first message 140 is a request for a promotional item having the item code 116. For example, the data processing apparatus 132 parses a text message or analyzes image or audio information in the first message 140. If the data processing apparatus 132 cannot identify the item code 116, it may request clarification by sending an error message (not shown) to the portable communication device 120. The data processing apparatus 132 can also extract the device ID 122 or any other consumer information from the first message 140, and determine whether the device ID 122 corresponds to a previously registered consumer.

If the device ID 122 is not registered, the data processing apparatus 132 automatically sends a second message 150 to the communication device 120. The second message 150 includes a request 152 for the consumer's address to which the promotional item should be delivered. In alternative implementations, the second message 150 can request other consumer contact information, such as an e-mail address, instead of or in addition to the consumer's address. The second message 150 can include an SMS or other text message. Alternatively, the second message can include a voice message, for example, a voice mail message. Optionally, the address request 152 can include a template or a script that the communication device 120 can use to guide the consumer through the process of providing the requested address. Or the address request 152 can include a trigger to activate a user interface program, such as an address menu, that resides in the portable communication device 120.

After the portable communication device 120 receives the second message 150, the consumer can reply to the promotional service provider 130 with a third message 160 that includes the consumer's address information 162 and the device ID 122 to identify the consumer. In one implementation, the address information 162 includes the consumer's name and postal address. The postal address can include a street number and street name, an apartment number, a suite number, a post office box number, a city name, or a ZIP code. For example, the consumer composes an SMS or other text message that includes the address information 162. In alternative implementations, the address information 162 includes other consumer contact information, such as an e-mail address, an alternative phone number or an alternative postal address, instead of or in addition to the consumer's postal address.

If the second message 150 includes a template or a script, the communication device 120 can use that template or script to help the consumer to provide the address information 162 correctly. Or the communication device 120 can include a user interface program, such as an address menu, that is activated by the address request 152 to provide the address information 162. Alternatively, the address information 162 can include audio information in which the consumer identifies the requested address. The portable communication device 120 can send the audio information "live" to the promotional service 130, or record the entire message before sending it to the promotional service 130.

Upon receiving the third message 160, the promotional service provider 130 processes the received address information 162. For example, the data processing apparatus 132 parses a text or analyzes audio information in the third message 160 to identify the consumer's address or other contact information. If the data processing apparatus 132 cannot identify the consumer's address, it can request clarification from the consumer by sending an error message (not shown) to the portable communication device 120.

The data processing apparatus 132 stores the consumer address in association with the device ID in a data storage 134 that includes a consumer information data base 136. In one implementation, the consumer information data base 136 includes, for each costumer, the consumer's address and the consumer's device ID. Optionally, the data base 136 can include further information, such as an alternative consumer address or contact information, such as an e-mail address or an alternative phone number. The consumer data base 136 can also include a consumer history describing past orders of the consumer. The consumer information data base 136 can be used by the promotional service provider 130 itself for designing future advertising and marketing campaigns. Or information from the data base 136 can be sold to third-party advertisers.

The data processing apparatus 132 also initiates the delivery of the requested promotional item, and optionally, sends further messages (not shown) to the portable communication device 120. These further messages can confirm that the delivery is in progress, or provide more information about the promotional service or advertisements related to the requested promotional item. For example, the data processing apparatus 132 can send a message with information about how to cancel the promotional service, or how to register for an advanced service that would allow the consumer to buy or order the advertised product or service by using the portable communication device 120. Further messages can also provide information about how to receive further promotion, or how to join or cancel services by using the portable communication device 120.

Once the consumer's address and the corresponding device ID 122 is stored in the storage 134, the promotional service provider 130 can handle future promotional item requests from the same portable communication device without asking for the consumer's address. However, the promotional service provider can verify for each future request whether the currently stored address or other contact information is still valid, and update the stored address or other contact information if there is any change. Optionally, the consumer can use the portable communication device 120 at any time to update his or her contact information stored at the promotional service provider 130.

Figure 2:
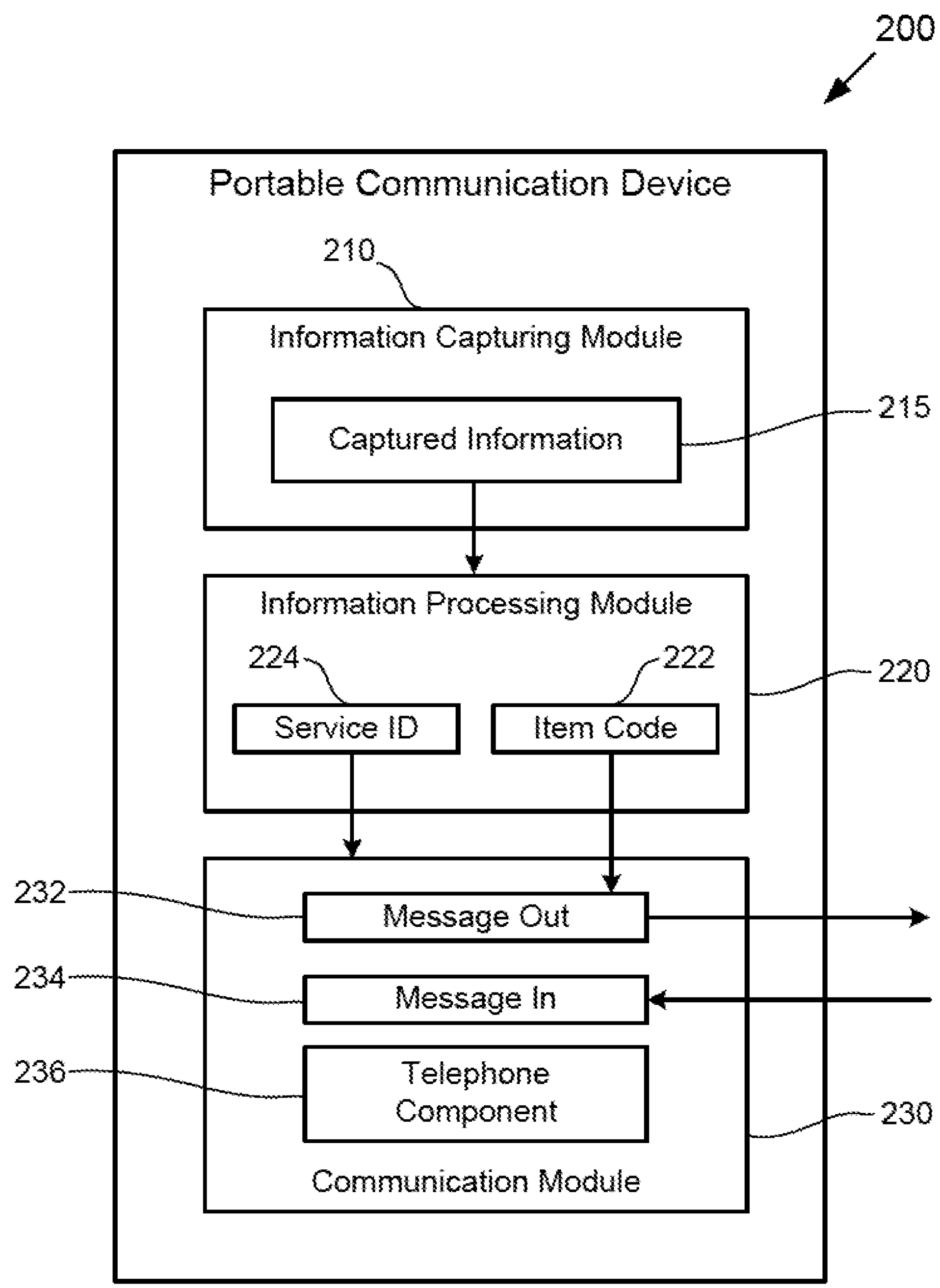
FIG. 2 is a schematic diagram illustrating a portable communication device for ordering promotional items.

FIG. 2 illustrates a portable communication device 200 that is a particular implementation of the communication device 120 (FIG. 1) that can be used by a consumer in the system 100 (FIG. 1) for ordering promotional items. In one implementation, the communication device 200 can include a handheld device, such as a mobile phone or a PDA. Alternatively, the portable communication device 200 can include a laptop device, such as a laptop computer.

The portable communication device 200 includes an information capturing module 210, an information processing module 220, and a communication module 230. The information capturing module 210 captures information 215 that, in turn, is processed by the information processing module 220. Based on the processed information, the information processing module 220 controls the communication module 230 that is configured to communicate with other (portable or non-portable) communication devices.

In one implementation, the information capturing module 210 includes a keyboard to capture text information (including letters, numbers, and other characters). Alternatively or in addition, the information capturing module 210 can include a microphone coupled to an audio circuit to capture audio information. The information capturing module 210 can also include a camera coupled to a video circuit to capture image or video information. Thus, the captured information 215 can include text, audio, or video data, or any combination of the different types of captured information. The information capturing module 210 can also include a bar code reader or a RFID reader to capture digital information encoded in a one or two dimensional barcode or an RFID.

The information processing module 220 processes the captured information 215 to identify communication and control data. For example, the information processing module 220 identifies a phone number based on the captured information 215, and instructs the communication module 230 to call that phone number. The information processing module 220 can also assemble messages based on the captured information 215, and instruct the communication module 230 to transmit the assembled messages. For example, the captured information 215 can include a string of characters received from a keyboard, and the information processing module 220 can format an SMS message based on the character string, and instruct the communication module 230 to send the SMS message to a corresponding destination.

In one implementation, the information processing module 220 receives captured information 215 that includes a promotional item code 222 and a promotional service identifier 224. The promotional service identifier 224 can be a phone number or other contact information that identifies a promotional service provider, such as the promotional service provider 130 (FIG. 1). Upon receiving a request from the consumer, the information processing module 220 controls the communication module 230 to send a message including the promotional item code 222 to the promotional service provider. In alternative implementations, the captured information 215 can include only the promotional item code 222, and the information processing module 220 uses prestored information to identify the service identifier 224, e.g., from the promotional item code 222.

If the captured information 215 includes audio, image, or video information, the information processing module 220 can compress or otherwise process that information and instruct the communication module 230 to transmit the compressed or processed information to a corresponding destination. In one implementation, the information processing module 220 is configured to extract codes, such as the promotional item code 222 or phone numbers, from the captured audio, image or video information 215. The information processing module 220 can also be configured to extract an address or other contact information from the captured audio information.

The communication module 230 is configured to send outgoing messages 232 to particular destinations and to receive incoming messages 234 from other communication devices. The outgoing and incoming messages 232 and 234 can include text messages, such as SMS messages. The communication module 230 can also be configured to send and receive messages that include image, video or audio information, for example, in a compressed format. The communication module 230 also includes a telephone component 236 to implement a "live" telephone service. In one implementation, the telephone component 236 uses the outgoing and incoming messages 232 and 234 to provide the live telephone service. Alternatively, the telephone component 236 can use a communication technique or channel that is different from that of the incoming and outgoing messages 232 and 234.

Figure 3:
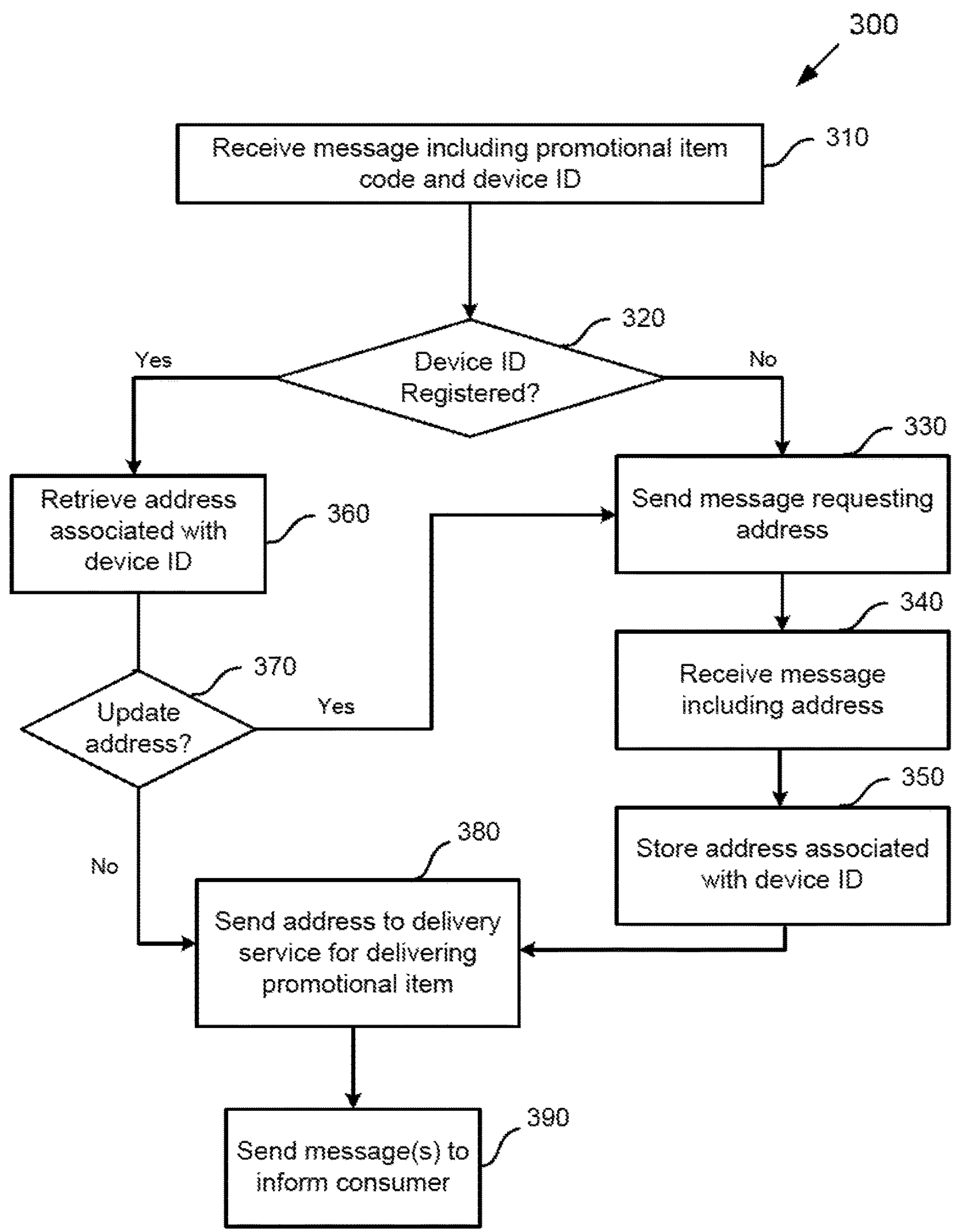
FIG. 3 is a schematic flow chart illustrating a method for collecting consumer information.

FIG. 3 illustrates a method 300 for collecting consumer information. The method 300 can be performed by a service provider, such as the promotional service provider 130 (FIG. 1), that provides a promotional service.

The service provider receives a message that includes a promotional item code and a device ID (step 310). The promotional item code identifies a promotional item that is included in an advertisement for a product or service. The device ID identifies a communication device from which the message has been received. In one implementation, the received message includes a text message, such as an SMS message. Alternatively or in addition, the received message can include audio, image or video information from which the service provider can identify the promotional item code or the consumer.

The service provider verifies whether the device ID has been previously registered for a promotional service (decision 320). For example, the service provider maintains a consumer information data base, and verifies whether the data base includes the received device ID. If the service provider handles multiple promotional services or advertisers, the service provider can identify the promotional service or advertiser which issued the received promotional item code, and determine whether the received device ID has been registered at that promotional service or advertiser. Alternatively, the service provider can verify whether the device ID has been registered at any of the multiple promotional services or advertisers.

If the device ID has not been registered ("No" branch of decision 320), the service provider sends a request to the communication device identified by the device ID for a delivery address (step 330). The address request can be sent in a message that includes text, audio, image or video information. The message can combine the different information types (text, audio, image or video) to enhance the user experience. The message can also include a template or a script to help the consumer to provide the requested address. The template can include, for example, separate items asking for the consumer's name, street number, name of the street, apartment number, city, and ZIP code. Or, the message can include a trigger to activate a corresponding user interface, such as an address selection menu, in the consumer's communication device.

In response to the address request, the service provider receives a message that includes the consumer's address or other contact information (step 340). In one implementation, the received message includes a text message identifying the consumer's address or other contact information. Alternatively, the received message includes audio information identifying the consumer's address or other contact information. Optionally, the service provider can verify whether the received address is a complete and valid address or not. If not, the service provider can send an error message to the consumer's communication device and ask for the missing information or clarification.

The service provider stores the consumer's address or other contact information in association with the device ID (step 350). For example, the consumer's address and the device ID are stored in the service provider's consumer information data base.

In addition to storing an unregistered consumer's device ID and address, the service provider can automatically register the consumer (and the device ID) for future services. Alternatively, the service provider is allowed to maintain the consumer's data only until the requested promotional item is delivered to the consumer (unless the consumer authorizes the future registration). In addition, the service provider can exchange messages with the consumer about the future services or how the consumer's information will be handled. For example, the service provider can send the consumer information about how to join or cancel different services.

If the device ID has been previously registered earlier ("Yes" branch of decision 320), the service provider retrieves the consumer's address associated with the device ID (step 360). In one implementation, the consumer's address is retrieved from the consumer information data base maintained by the service provider. Alternatively, according to the registered consumer's authorization, the service provider can contact a third party that can provide the consumer's most recent address. For example, the service provider can contact a phone company at which the device ID is registered.

In one implementation, the service provider verifies whether the registered consumer is eligible for the promotion. For example, the service provider can verify whether the particular promotional item has been previously provided to the registered consumer. The service provider can also limit the total number of different promotional items that a particular consumer can receive within a preset time period. If the registered consumer is eligible, the service provider proceeds with processing the received order.

The service provider determines whether the retrieved address should be updated (decision 370). For example, the service provider can determine how much time has passed from the registration of the retrieved address or the last successful delivery. If more than a predetermined time has passed, the service provider can request an update. Or the service provider can request an update if there were irregularities at the last delivery to the registered consumer. In alternative implementations, the service provider or the consumer can automatically request or skip the update of the retrieved address.

If an update is requested ("Yes" branch of decision 370), the service provider sends a request for the updated address (step 330), and upon receiving a message with the updated address (step 340), stores the updated address in association with the device ID (step 350).

When the correct address is stored (step 350) or if no update has been requested ("No" branch of decision 370), the service provider sends the consumer's address or other contact information to a delivery service for packing and delivering the requested promotional item (step 380). The promotional item can be delivered to the consumer with additional advertisements that have been selected based on the consumer's selection of the promotional item or, for a registered consumer, based on the consumer's prior orders and purchases. In addition to "hard" promotional items, the delivery service can also provide the consumer with digital content, such as ringtones, images, audio or video clips.

Next, the service provider sends a message to the communication device identified by the device ID to provide further information to the consumer (step 390). For example, the service provider can send a confirmation that the requested promotional item is being delivered. The confirmation can include the delivery address, an estimated delivery time, and information about how the consumer can delay or cancel the delivery or change the delivery address. The service provider can also send a message including information about the promotional service or additional services. The message can also explain how the consumer can opt for or opt out of a particular service. For example, the message can request the consumer's authorization for future registration, or include information about how the current registration can be cancelled or changed. For example, the message can explain how the consumer can upgrade to a "full" service that allows the consumer to use his or her communication device not only to order the promotional items but to receive future promotions and also to purchase the advertised product or service.

Figure 4:
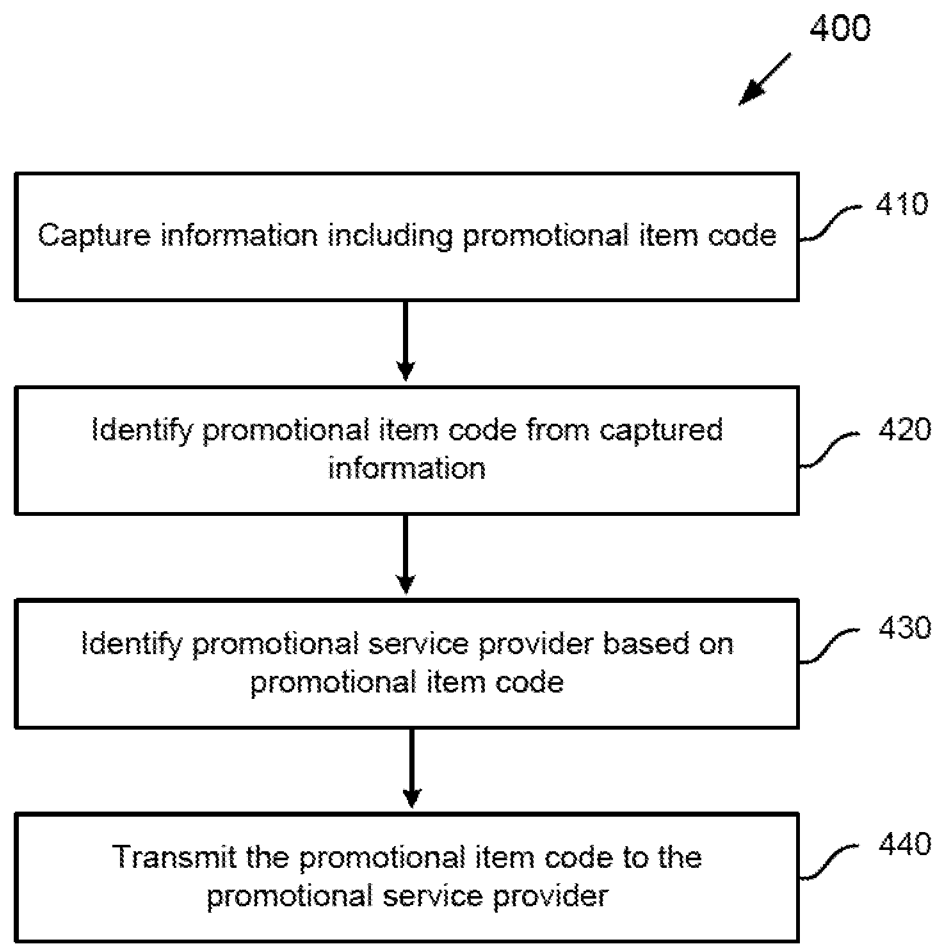
FIG. 4 is a schematic flow chart illustrating a method for ordering promotional items.

FIG. 4 illustrates a method 400 for ordering promotional items. The method 400 can be performed by a communication device, such as the portable communication device 120 in the system 100 (FIG. 1). By using the method 400, a consumer can conveniently order promotional items. For example, the consumer can enter only a code of the promotional item without entering detailed contact information, such as a phone number.

The communication device captures information that includes a promotional item code (step 410). In one implementation, the communication device includes a keyboard configured to allow the consumer to enter characters, and the promotional item code is captured in a character series that is entered through the keyboard. In alternative implementations, the communication device can include an image capturing circuitry to capture an image of the promotional item code. Or the communication device can have an audio capturing circuitry to record the consumer's voice announcing the promotional item code. The communication device can also include a bar code reader or an RFID reader to identify the promotional item code. If the promotional item code is captured by an image or audio capturing circuitry, or a bar code or RFID reader, the consumer is generally not required to use the communication device's keyboard, which is often difficult to use for typing and is prone to errors.

The communication device identifies the promotional item code from the captured information (step 420). For example, the communication device includes a data processing module that identifies the promotional item code by parsing the character series from the keyboard, or analyzing the captured image or the recorded voice.

The communication device identifies a promotional service provider based on the promotional item code (step 430). In one implementation, the communication device stores information about one or more promotional service providers, and compares the stored information with the captured information to identify the corresponding service provider. For example, the communication device can store for each service provider a respective trademark or service code that is included in promotional item codes issued by that service provider. Thus, the communication device can identify the corresponding promotional service provider by determining which of the stored trademarks or service codes is included in the currently processed promotional item code.

The communication device transmits the promotional item code to the promotional service provider to request the corresponding promotional item (step 440). The communication device can be configured to transmit the promotional item code without requesting contact information of the service provider form the consumer. In one implementation, the communication device retrieves a contact information from the information stored about the service provider, and sends a message to the service provider according to the retrieved contact information. For example, the contact information can include a phone number, and the message includes a text message, such as an SMS message. Thus, the consumer can order the promotional item in a fast, efficient and convenient way.

The present application discloses techniques, including methods, systems, and apparatus, for ordering promotional items and processing consumer information. The techniques of the present application have been described with reference to particular implementations. Other implementations are within the scope of the following claims, and can include many variations. For example, although promotional item descriptions were disclosed in combination with advertisements for products or services, the promotional item descriptions can also be distributed to consumers independently from any advertisements. Or promotional items can include not only physical objects, but also digital content that can be delivered to the consumers either electronically or by regular mail. Consumers can be identified not only by their device IDs, but also by device independent personal information, such as their names or addresses. The described methods, or portions of them, can be implemented in software, hardware, or in a combination of software and hardware. Steps in the described methods can be performed in different order and still provide desirable results.

The invention claimed is:

1. A method for collecting consumer information using a promotional service provider system including data processing apparatus and a system storage, the method comprising:

receiving a first message in the promotional service provider system from a portable communication device having a device identifier associated with a first consumer, the first message including the device identifier and a promotional item image having a promotional item code that identifies a promotional item offered to consumers as part of a promotional service that is advertising one or more products or services, wherein the portable communication device includes a mobile phone capable of providing a text messaging service;

analyzing the promotional item image received from the portable communication device to obtain the promotional item code;

based on information stored in the system storage, determining that the device identifier in the first message is not registered for the promotional service corresponding to the promotional item code;

from the promotional service provider system, sending a second message to the portable communication device through the text messaging service of the mobile phone in response to the first message, the second message requesting the first consumer to provide a delivery address of the first consumer for delivering the promotional item;

in response to the second message, receiving a third message from the first consumer through the text messaging service of the mobile phone, the third message including a consumer-composed text message describing the delivery address of the first consumer;

parsing the consumer-composed text message in the third message to determine the delivery address of the first consumer;

storing the determined delivery address in association with the device identifier in the system storage and registering the first consumer and the device identifier for future services; and updating the determined delivery address of the first consumer, wherein updating occurs after a predetermined time has passed since the registering of the first consumer or a successful delivery of the promotional item.

2. The method of claim 1, further comprising:

verifying whether the delivery address determined from the third message corresponds to a postal address.

3. The method of claim 1, further comprising:

sending the delivery address to a delivery service for delivering the promotional item to the first consumer.

4. The method of claim 1, wherein the text messaging service includes Short Message Service ("SMS") and the third message includes a SMS text message.

5. The method of claim 1, further comprising:

retrieving the stored delivery address associated with the registered device identifier from the system storage; and sending the retrieved delivery address to a delivery service for delivering the promotional item to the first consumer.

6. The method of claim 1, wherein the portable device is a handheld device.

7. The method of claim 1, wherein the device identifier includes a telephone number associated with the mobile phone.

8. The method of claim 4, wherein the first message includes a SMS text message.

9. The method of claim 4, wherein the second message includes a SMS text message.

10. The method of claim 1, wherein the promotional item includes a physical object.

11. The method of claim 1, further comprising:

sending a confirmation to the portable device.

12. A non-transitory computer-readable medium comprising executable instructions configured to cause data processing apparatus in a promotional service provider system to perform operations comprising:

receiving a first message in the promotional service provider system from a portable communication device having a device identifier associated with a first consumer, the first message including the device identifier and a promotional item image having a promotional item code that identifies a promotional item offered to consumers as part of a promotional service that is advertising one or more products or services, wherein the portable communication device includes a mobile phone capable of providing a text messaging service;

analyzing the promotional item image received from the portable communication device to obtain the promotional item code;

determining that the device identifier in the first message is not registered for the promotional service corresponding to the promotional item code;

from the promotional service provider system, sending a second message to the portable communication device through the text messaging service of the mobile phone in response to the first message, the second message requesting the first consumer to provide a delivery address of the first consumer for delivering the promotional item;

in response to the second message, receiving a third message from the first consumer through the text messaging service of the mobile phone, the third message including a consumer-composed text message describing the delivery address of the first consumer;

parsing the consumer-composed text message in the third message to determine the delivery address of the first consumer;

storing the determined delivery address in association with the device identifier in the system storage and registering the first consumer and the device identifier for future services; and updating the determined delivery address of the first consumer, wherein updating occurs after a predetermined time has passed since the registering of the first consumer or a successful delivery of the promotional item.

13. The computer-readable medium of claim 12, further comprising executable instructions to cause data processing apparatus to perform operations comprising:

verifying whether the delivery address determined from the third message corresponds to a postal address.

14. The computer-readable medium of claim 12, further comprising executable instructions to cause data processing apparatus to perform operations comprising:

sending the delivery address to a delivery service for delivering the promotional item to the first consumer.

15. The computer-readable medium of claim 12, wherein the text messaging service includes Short Message Service ("SMS") and each of the first, second and third messages includes a SMS text message.

16. The computer-readable medium of claim 12, further comprising executable instructions to cause data processing apparatus to perform operations comprising:

retrieving the stored delivery address associated with the registered device identifier; and sending the retrieved delivery address to a delivery service for delivering the promotional item to the first consumer.

17. The computer-readable medium of claim 12, wherein the portable device is a handheld device.

18. The computer-readable medium of claim 12, wherein the promotional item includes a physical object.

19. A portable communication device having a device identifier associated with a first consumer, the device comprising:

an information capturing module including circuitry configured to capture information including a promotional item image having a promotional item code that identifies a promotional item offered to consumers as part of a promotional service by a promotional service provider that is advertising one or more products or services;

an information analyzing module including circuitry configured to analyze the promotional item image received from the information capturing module to obtain the promotional item code;

an information processing module including circuitry configured to identify from the captured information the promotional item code, and to identify the promotional service provider based on the promotional item code; and a communication module including a mobile phone capable of providing a text messaging service, the communication module configured to:

transmit the device identifier and the promotional item code to the promotional service provider;

receive a message from the promotional service provider through the text messaging service of the mobile phone in response to the transmitted promotional item code, the received message requesting the first consumer to provide a delivery address of the first consumer for delivering the promotional item;

in response to the request, receive user input to compose and send a text message describing the delivery address of the first consumer to the promotional service provider through the text messaging service of the mobile phone;

receive an update message from the promotional service provider through the text messaging service of the mobile phone requesting the first consumer to update the delivery address of the first consumer; and in response to the request, receive user input to compose and send a text message describing the delivery address of the first consumer to the promotional service provider through the text messaging service of the mobile phone.

20. The device of claim 19, wherein the information capturing module includes a keyboard to receive user input, and the information processing module is configured to identify the promotional item code from the user input received by the keyboard.

21. The device of claim 19, wherein the text messaging service includes Short Message Service ("SMS") and the communication module is configured to transmit the identified promotional item code in a SMS text message.

22. The device of claim 19, wherein the device identifier includes a phone number associated with the mobile phone.

* * * * *